(12) United States Patent
Kobayashi

(10) Patent No.: US 7,249,407 B2
(45) Date of Patent: Jul. 31, 2007

(54) METHOD OF MANUFACTURING MAGNETIC HEAD

(75) Inventor: Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 32 days.

(21) Appl. No.: 11/345,112

(22) Filed: Feb. 1, 2006

(65) Prior Publication Data

US 2006/0174471 A1   Aug. 10, 2006

(30) Foreign Application Priority Data

Feb. 10, 2005   (JP)   ............... 2005-033864

(51) Int. Cl.
*G11B 5/127* (2006.01)
*H04R 31/00* (2006.01)

(52) U.S. Cl. ............... 29/603.14; 29/603.12; 29/603.15; 29/603.16; 29/603.18; 29/606; 360/126; 360/317; 427/127; 427/128; 205/119; 205/122; 451/5; 451/41

(58) Field of Classification Search ............ 29/603.12, 29/603.14–603.16, 603.18, 606; 205/119, 205/122; 360/126, 317; 427/127, 128; 451/5, 451/41
See application file for complete search history.

(56) References Cited

U.S. PATENT DOCUMENTS 4,760,481 A * 7/1988 Yuito et al. ............... 360/123
6,490,128 B1   12/2002 Sato
6,538,846 B1 * 3/2003 Sato ............................ 360/126
2003/0165030 A1   9/2003 Sato et al.

FOREIGN PATENT DOCUMENTS

JP   A-2000-322709   11/2000
JP   A-2003-257006   9/2003

* cited by examiner

*Primary Examiner*—Paul D. Kim
(74) *Attorney, Agent, or Firm*—Brinks Hofer Gilson & Lione

(57) ABSTRACT

A method of manufacturing a magnetic head is provided which can improve controlling a thickness of a gap layer. A coil base layer having at least a surface layer formed of one or two or more alloys selected from Au, Ru, and Rh is formed on a contact layer. Thereby, since a surface of the coil base layer is not oxidized due to air exposure, the contact layer is not oxidized. As such, the coil base layer protects the contact layer, so that it is not necessary to perform an etching process for removing an oxide layer, as in the related art. Therefore, it is possible to further improve controlling a thickness of a gap layer without cutting the gap layer by the etching process, as compared with the related art.

5 Claims, 9 Drawing Sheets

METHOD OF MANUFACTURING MAGNETIC HEAD

BACKGROUND OF THE INVENTION

1. Field of the Invention

The present invention relates to a method of manufacturing a magnetic head which is capable of improving controlling a thickness of a gap layer.

2. Description of the Related Art

Generally, an inductive head for recording a magnetic signal on a recording medium has a structure in which it includes a first magnetic layer and a second magnetic layer that are opposite to each other in a film thicknesswise direction at a surface facing the recording medium with a gap layer interposed therebetween, and a coil layer that is provided between the first magnetic layer and the second magnetic layer at a location farther than the facing surface in a heightwise direction.

FIG. 15 is a diagram illustrating one process of a method of manufacturing a conventional perpendicular magnetic recording head. In addition, FIG. 15 is a partial longitudinal cross-sectional view of the conventional perpendicular magnetic recording head.

As shown in FIG. 15, reference numeral 1 indicates a shield layer. On the shield layer 1, lower coil pieces 3, which form a helical coil with a coil insulating layer 2 interposed between the shield layer 1 and the lower coil pieces 3, are formed in a plurality of columns. One end of a lower coil piece 3a among the lower coil pieces 3, which is formed so as to be closest to the surface F facing the recording medium, and one end of the lower coil piece 3b among the lower coil pieces 3, which is formed so as to be farthest from the surface F facing the recording medium in a heightwise direction (Y direction in the drawing), extends more than the other lower coil pieces 3 so as to form a coil lead layer 4. As shown in FIG. 15, a conductive contact layer 5 is formed on the coil lead layer 4, and a surface of the conductive contact layer 5 is exposed to a surface of a coil insulating layer 6 for covering the lower coil pieces 3.

As shown in FIG. 15, a main magnetic pole layer 7 and an auxiliary yoke layer 8 are sequentially formed on the coil insulting layer 6. As shown in FIG. 15, the auxiliary yoke layer 8 is formed so as to retreat more than the facing surface F in a heightwise direction (Y direction in the drawing), and a non-magnetic gap layer 9 is formed on the main magnetic pole layer 7 exposed to the facing surface F and the auxiliary yoke layer 8. As shown in FIG. 15, a Gd determining layer 10 and an insulating base layer 11 are formed on the gap layer 9. A plurality of upper coil pieces 13 are formed on the insulating base layer 11 in a plurality of columns. The plurality of upper coil pieces 13 form a helical coil with a plurality of conductive coil base layers 12 interposed between the insulating base layer 11 and the upper coil pieces 13. As shown in FIG. 15, the upper coil pieces 13 are covered with a coil insulating layer 14 made of resist or the like.

As shown in FIG. 15, before the process proceeds to a process illustrated in FIG. 16, a surface of the contact layer 5 exposed to the surface of the coil insulating layer 6 is etched, and an oxide layer formed on the surface of the contact layer 5 is removed (cleaning process). The contact layer 5 is formed of a material, such as Cu or the like, which has excellent conductivity, but it is likely to be oxidized. In addition, the coil base layer 12 is first formed on the contact layer 5. Then, the unnecessary coil base layers 12 are removed by an etching process, except for the coil base layers 12 formed below the upper coil pieces 13. However, in this case, the coil base layer 12 formed on the contact layer 5 may not be removed by the etching process, and may remain on the contact layer 5. Even in this case, since the coil base layer 12 has a laminated structure between Cu and Ti and an oxide layer is easily formed on the coil base layer 12, it is required to perform a cleaning process for removing the oxide layer of the surface of the contact layer. As shown in FIG. 16, the cleaning process is necessary for implementing conductivity between the contact layer 5 and a conductive lifting layer 17 formed on the contact layer 5. In addition, the reason why the oxide layer is formed is as follows. In the process illustrated in FIG. 16, when a magnetic head is carried in a sputtering device in the middle of a process of forming a return yoke base layer 16 on the gap layer 9 exposed to the facing surface F and the coil layer 14 by using a sputtering method before forming a return yoke layer 15 by plating, it may be easily affected by the air. In addition, when the coil insulating layer 14 is formed, oxide may occur due to a patterning process such as exposure, development, or the like or a hardening heating process.

Accordingly, as described above, the etching process is performed so as to remove the oxide layer formed on the surface of the contact layer. However, as shown in FIG. 15, since the gap layer 9 is exposed to the facing surface F ahead of the Gd determining layer 10, the gap layer 9 is also affected by the etching process. As a result, as shown in FIG. 17, the thickness H1 of the gap layer 9 becomes smaller than the original thickness H2. As such, in the conventional method of manufacturing the magnetic head, since deviation may occur in the thickness of the gap layer 9, it is not possible to properly control the thickness of the gap layer 9.

As shown in FIG. 17, the Gd determining layer 10 formed on the gap layer 9 is provided so as to regulate a gap depth (Gd). However, the surface 10a of the Gd determining layer 10 is affected by the etching process, so that the surface 10a is cut as shown by a dot line in FIG. 17, thereby varying the gap depth (Gd). In addition, after the surface 10a is cut, the gap layer 9 may be further affected by the etching process, so that the gap layer 9 may be further cut. In particular, the influence of the etching with respect to the gap layer 9 below the Gd determining layer 10 varies by a shape of the surface 10a of the Gd determining layer 10 or to what extent the surface 10a is affected by the etching process. Therefore, it is likely for the shape of the gap layer 9 not to be uniform.

In U.S. Pat. No. 6,490,128 and US Publication No. 2003/0165030, the above-mentioned problems are not described. Therefore, countermeasures for resolving the above-mentioned problems are also not suggested. For example, according to a method disclosed in U.S. Pat. No. 6,490,128, an ion milling process is performed so as to remove an oxide layer in a process illustrated in FIG. 7 (column 12, line 66 to column 13, line 6), but a gap layer 28a is affected by the ion milling process.

SUMMARY OF THE INVENTION

The present invention has been finalized in view of the drawbacks inherent in the conventional magnetic head, and it is an object of the present invention to provide a method of manufacturing a magnetic head which is capable of improving thickness controllability of a gap layer.

According to an aspect of the invention, there is provided a method of manufacturing a magnetic head which includes a first magnetic layer and a second magnetic layer that are opposite to each other in a film thicknesswise direction at a surface facing a recording medium with a gap layer interposed therebetween, and a coil layer that applies a recording magnetic field to the first magnetic layer and the second magnetic layer. The method includes the steps of (a) forming a conductive coil base layer on a conductive contact layer, the conductive coil base layer being formed on the first magnetic layer with the gap layer interposed therebetween, the conductive contact layer being exposed to an insulating material layer burying the periphery of the first magnetic layer, at least a surface layer of the coil base layer being formed of one or two or more alloys selected from Au, Ru, and Rh; (b) forming a coil layer on a predetermined region of the coil base layer; (c) covering the coil layer with a coil insulating layer; (d) forming a conductive base layer on the gap layer and the coil insulating layer by using a sputtering method so as to plate the second magnetic layer on the conductive base layer, the gap layer being exposed more toward the facing surface than the coil insulating layer; and (e) plating a conductive layer on the coil base layer remaining on the contact layer.

According to this aspect, the coil base layer is formed on the contact layer. In this case, at least a surface layer of the coil base layer is formed of one or two or more alloys selected from Au, Ru, and Rh. Thereby, the surface of the coil base layer is not oxidized due to the air exposure, so that the contact layer is not oxidized. As such, the contact layer is properly protected by the coil base layer. Therefore, unlike the related art, since the etching process for removing the oxide layer is not necessary before proceeding to the step (d), it is possible to improve the film thickness control and shape control of the gap layer without cutting the gap layer by the etching process, and it is possible to restrict the gap depth to a predetermined value. In particular, these effects can be achieved without increasing the number of processes, as compared with the related art, and since the etching process is not necessary, the number of the processes can be reduced as compared to the related art. This is because the coil base layer functions as a base when the coil layer is formed and functions as a protective layer for preventing the surface of the contact layer from oxidizing.

Preferably, during the step (b), a portion of the coil base layer that is not covered with the coil layer is removed in a state in which the coil base layer formed on the contact layer is protected after forming the coil layer. Thereby, the coil base layer can remain on the contact layer. In addition, by removing the unnecessary coil base layer, the coil base layer remaining below the coil layer can be electrically separated from the coil base layer remaining on the contact layer.

Preferably, the method of manufacturing a magnetic head further includes the steps of, before the step (a), forming a lower coil layer at a lower side of the first magnetic layer; forming the contact layer on a predetermined portion of the lower coil layer; and exposing the contact layer to the insulating material layer. Preferably, the coil layer formed by the step (b) is formed as an upper coil layer that is provided between the first magnetic layer and the second magnetic layer.

Preferably, the conductive layer in the step (e) is formed of the same material as the second magnetic layer, and the forming of the second magnetic layer in the step (d) and the forming of the conducive layer in the step (e) are simultaneously performed. Thereby, the manufacturing process can be simplified.

Preferably, the method of manufacturing a magnetic head further includes the steps of, before the step (a), forming a reproducing head unit having a magnetism detecting element and a shield layer at a location lower than the first magnetic layer; forming the contact layer on an electrode layer for supplying a current to the magnetism detecting element; and exposing the contact layer to the insulating material layer.

According to the embodiment of the invention, the coil base layer having at least a surface layer formed of one or two or more alloys selected from Au, Ru, and Rh is formed on the contact layer. Thereby, the surface of the coil base layer is not oxidized due to the air exposure, so that the contact layer is not oxidized. As such, the contact layer is properly protected by the coil base layer. Therefore, unlike the related art, since the etching process for removing the oxide layer is not necessary, it is possible to improve control of the film thickness and shape of the gap layer without cutting the gap layer by the etching process as compared with the related art, and it is possible to restrict the gap depth to a predetermined value.

DESCRIPTION OF THE PREFERRED EMBODIMENT

Figure 1:
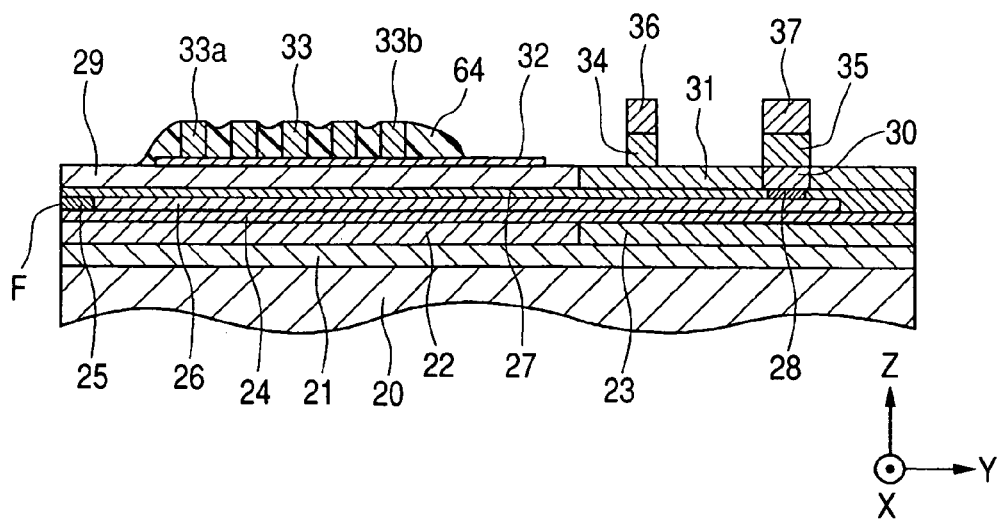
FIG. 1 is a partial longitudinal cross-sectional view of a magnetic head which is a diagram illustrating one process of a method of manufacturing the magnetic head according to an embodiment of the invention.

FIGS. 1 to 12 are partial longitudinal cross-sectional views of a magnetic head which are diagrams illustrating processes of a method of manufacturing the magnetic head according to an embodiment of the invention.

Hereinafter, in the respective drawings, an X direction is referred to as a track widthwise direction. The track widthwise direction is a direction which is orthogonal to each film thicknesswise direction and heightwise direction ((element heightwise direction). A direction which is perpendicular to a surface F facing a recording medium (a surface parallel to an X-Z plane) and spaced apart from the surface F facing the recording medium)). In addition, a Y direction in the drawings is the heightwise direction, and a Z direction in the drawings is a film thicknesswise direction.

In FIG. 1, reference numeral 20 indicates a slider. The slider 20 is formed of a non-magnetic material, such as $Al_2O_3 \cdot TiC$ or the like. As shown in FIG. 1, an insulating material layer 21 made of $Al_2O_3$ or the like is formed on a surface of the slider 20, and a lower shield layer 22 made of a magnetic material is formed on the insulating material layer 21. An insulating material layer 23 made of $Al_2O_3$ or the like is formed in the vicinity of the lower shield layer 22, and surfaces of the lower shield layer 22 and the insulating material layer 23 are planarized by using a CMP technology.

As shown in FIG. 1, a lower gap layer 24 made of an insulating material is formed on the lower shield layer 22 and the insulating material layer 23, and a magnetoresistance effect element 25 such as a spin-valve-type thin film element or the like is formed on the lower gap layer 24. The magnetoresistance effect element 25 is connected to an electrode layer 26 formed of a conductive material. A current is supplied to the magnetoresistance effect element 25 through the electrode layer 26.

As shown in FIG. 1, a first lifting layer 28 made of a conductive material is formed on the electrode layer 26. The electrode layers 26 are respectively formed on both sides of a track widthwise direction (X direction in the drawing) in a state in which the magnetoresistance effect element 25 is located in between the electrode layers 26. The first lifting layers 28 are actually formed on the electrode layers 26, respectively. However, in FIG. 1, only one first lifting layer 28 is shown.

As shown in FIG. 1, an upper gap layer 27 made of an insulating material is formed on the magnetoresistance effect element 25 and the electrode layer 26, a top surface of the upper gap layer 27 and a top surface of the first lifting layer 28 are planarized by using a CMP technology, and the top surface of the first lifting layer 28 is exposed to the top surface of the upper gap layer 27. As shown in FIG. 1, an upper shield layer 29 made of a magnetic material is formed, and a second lifting layer 30 is formed on the first lifting layer 28 by using the same material as the upper shield layer 29. In addition, an insulating material layer 31 is formed on a portion of the upper gap layer 27 where the upper shield layer 29 and the second lifting layer 30 are not formed. The top surfaces of the upper shield layer 29, the second lifting layer 30, and the insulating material layer 31 are planarized by using a CMP technology.

As shown in FIG. 1, on the upper shield layer 29, an insulating base layer 32 is formed using $Al_2O_3$, and then a lower coil piece base layer (not shown) made of a conductive material is formed by a sputtering method. Then, lower coil pieces 33 are plated on the lower coil piece base layer by means of a photography technology. As shown in FIG. 1, the plurality of lower coil pieces 33 are formed so as to form a plurality of columns. These lower coil pieces 33 (lower coil layers) are electrically connected to upper coil pieces (upper coil layers), respectively, which will be described in detail below. As a result, the lower coil pieces 33 and the upper coil pieces form a helical coil that is wound around a main magnetic pole layer. When the lower coil pieces 33 are formed, a leading portion 34 is integrated with one end of a lower coil piece 33a (in an X direction in the drawing) and one end of a lower coil piece 33b (in an X direction in the drawing). The lower coil piece 33a is formed so as to be closest to the surface F facing the recording medium among the lower coil pieces 33, and the lower coil piece 33b is formed so as to be farthest from the surface F facing the recording medium in a heightwise direction among the lower coil pieces 33. A current is supplied to the helical coil through the leading portion 34. In addition, at the same time as the forming of the lower coil pieces 33, a third lifting layer 35 is plated on the second lifting layer 30 by using the same material as the lower coil pieces 33. In FIG. 1, only one leading portion 34 is shown.

As shown in FIG. 1, a recording-side contact layer 36 made of a conductive material is plated on the leading portion 34 and a reproducing-side contact layer 37 made of a conductive material is plated on the third lifting layer 35. Each of the recording-side contact layer 36 and the reproducing-side contact layer 37 is plated with Cu or the like so as to be formed. The plating formation of the recording-side contact layer 36 and the reproducing-side contact layer 37 is performed by means of a photolithography technology. As shown in FIG. 1, spaces between the lower coil pieces 33 are buried with an organic insulating layer 64 made of resist or the like.

Figure 2:
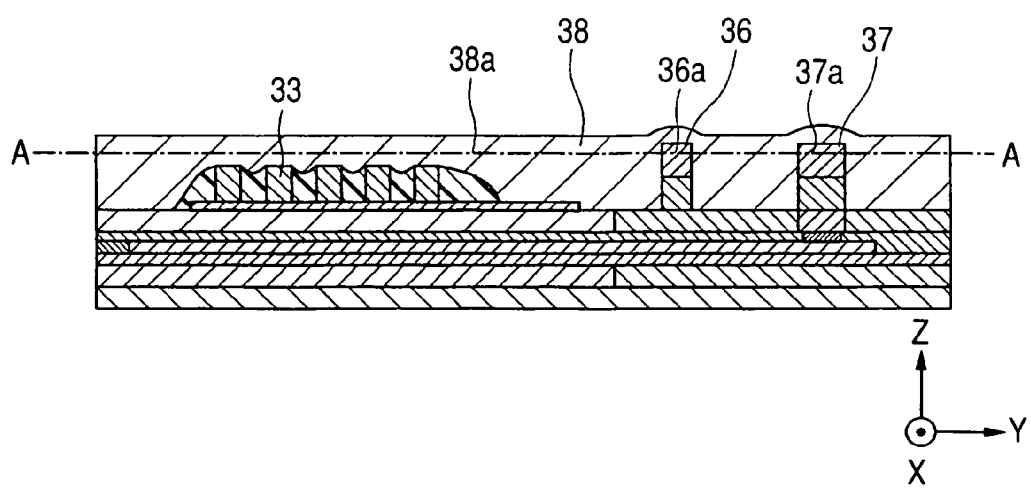
FIG. 2 is a diagram illustrating a following process of FIG. 1 (partial longitudinal cross-sectional view)

Next, in a process illustrated in FIG. 2, the lower coil pieces 33, the recording-side contact layer 36, and the reproducing-side contact layer 37 are covered with an insulating material layer 38 made of an insulating material such as $Al_2O_3$ or the like. For example, the insulating material layer 38 is formed by means of a sputtering method. Then, the insulating material layer 38 is cut by a line II-II shown in FIG. 2, the top surface 38a of the insulating material layer 38 is planarized, and the top surface 36a of the recording-side contact hole 36 and the top surface 37a of the reproducing-side contact layer 37 are exposed to the top surface 38a of the insulating material layer 38.

Figure 3:
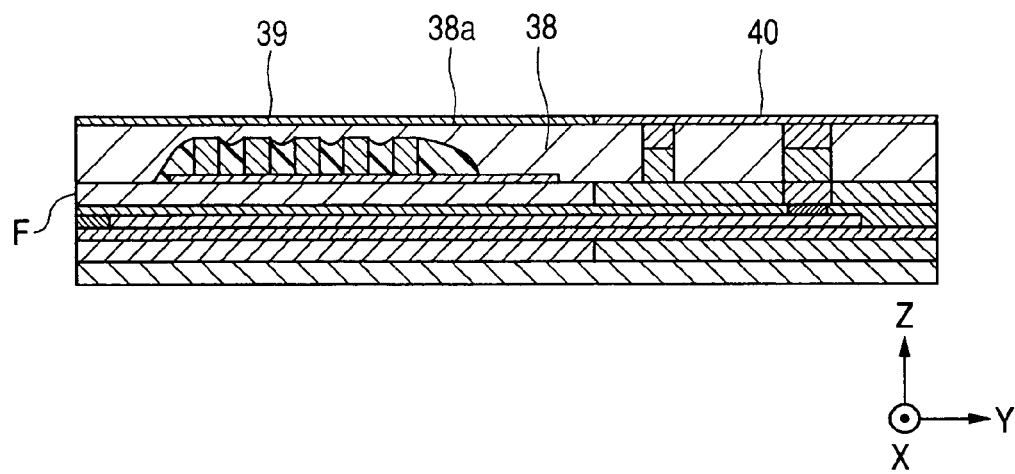
FIG. 3 is a diagram illustrating a following process of FIG. 2 (partial longitudinal cross-sectional view)

Next, in a process illustrated in FIG. 3, a main magnetic pole layer 39 is plated on the insulating material layer 38. In this case, the main magnetic pole layer 39 (first magnetic layer) is formed by using a photolithography technology. First, a main magnetic pole base layer made of a conductive material, such as Au, NiFe, or the like, is formed on the entire surface of the insulating material layer 38 by using a sputtering method, a resist layer is coated on the main magnetic pole base layer, an extraction pattern having the same shape as the main magnetic pole layer is formed in the resist layer by using an exposure phenomenon. Further, the main magnetic pole layer 39 is plated in the extraction pattern. In addition, an insulating material layer 40 made of $Al_2O_3$ or the like is formed on the main magnetic pole layer 39 and the insulating material layer 38 by using a sputtering method, and a planarizing process is performed by using a CMP technology until the top surface of the insulating material layer 40 and the top surface of the main magnetic pole layer 39 are on the same plane. The inductive head (recording head), which has been described with respect to the structure in FIGS. 3 to 12, is called a perpendicular magnetic recording head. The perpendicular magnetic recording head has a structure in which the main magnetic pole layer 39 and a return yoke layer 52 (which will be described in detail below) are formed in a film thicknesswise direction (Z direction in the drawing) at a predetermined gap at the facing surface F.

Figure 4:
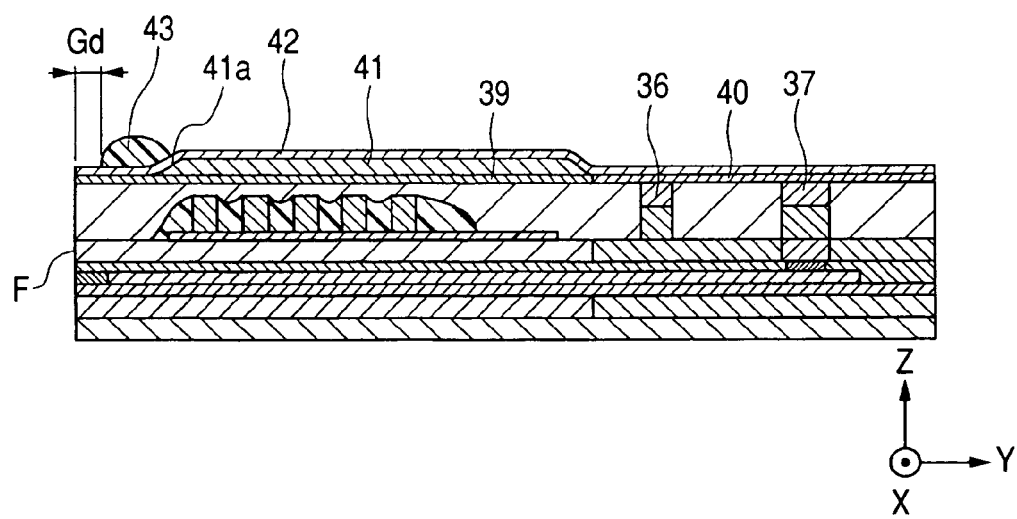
FIG. 4 is a diagram illustrating a following process of FIG. 3 (partial longitudinal cross-sectional view)

Next, in a process illustrated in FIG. 4, an auxiliary yoke layer 41 is formed on the main magnetic pole layer 39 by plating or sputtering. As shown in FIG. 4, a front end surface 41a of the auxiliary yoke layer 41 is formed so as to retreat more in a heightwise direction (Y direction in the drawing) than the facing surface F, and the front end surface 41a is not exposed to the facing surface F. As shown in FIG. 4, by means of a sputtering method, a gap layer 42 made of a non-magnetic material is formed on the main magnetic pole layer 39 exposed to the front of the auxiliary yoke layer 41, the auxiliary yoke layer 41, and the insulating material layer 40. Next, formed is a Gd determining layer 43, which is formed on a portion of the gap layer 42 and at a location retreating more in a heightwise direction (Y direction in the drawing) than the facing surface F. The Gd determining layer 43 is formed of, for example, resist, and is then subjected to a heat treatment so as to be hardened. A gap depth (Gd) is regulated by a length from the facing surface F to the Gd determining layer 43.

Figure 5:
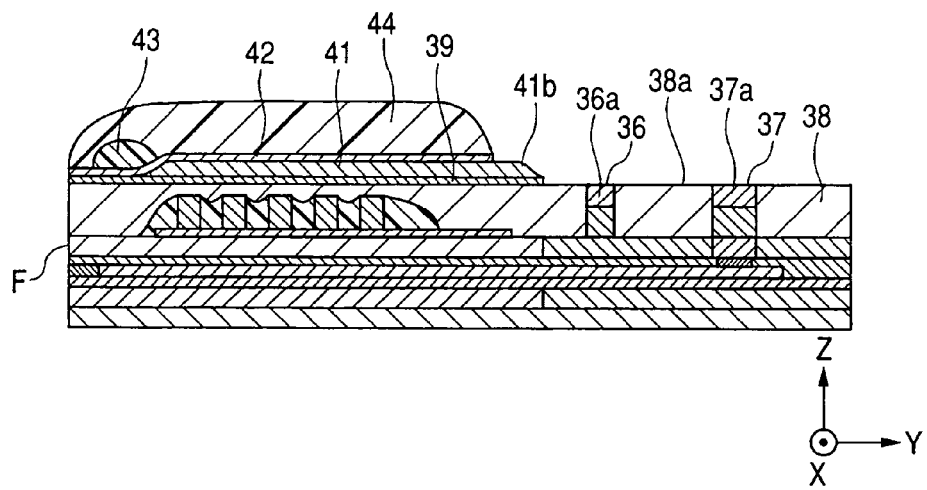
FIG. 5 is a diagram illustrating a following process of FIG. 4 (partial longitudinal cross-sectional view)

Next, in a process illustrated in FIG. 5, a protective resist layer 44 is formed on the gap layer 42 and the Gd determining layer 43 that are formed on the main magnetic pole layer 39 and the auxiliary yoke layer 41, respectively. A part of the gap layer 42 that is not covered with the protective resist layer 44 and a part of the insulating material layer 38 that covers the recording-side contact layer 36 and the reproducing-side contact layer 37 are cut by etching. In addition, top surfaces 36a and 37a of the recording-side contact layer 36 and the reproducing-side contact layer 37 are exposed to a top surface 38a of the insulating material layer 38. The main magnetic pole layer 39, the auxiliary yoke layer 41, and the gap layer 42 and the Gd determining layer 43 formed on the main magnetic pole layer 39 and the auxiliary yoke layer 41, which are covered with the protective resist layer 44, are not affected by the etching. As shown in FIG. 5, it is preferable that the protective resist layer 44 is not provided on the rear end portion 41b of the auxiliary yoke layer 41, and the gap layer 42 formed on the rear end portion 41b of the auxiliary yoke layer 41 is cut by the etching process so as to expose the rear end portion 41b. The rear end portion 41b is a portion which is connected to the return yoke layer 52 formed through the following process. The process of cutting the gap layer 42 formed on the rear end portion 41b of the auxiliary yoke layer 41 may not be performed in the process illustrated in FIG. 5 but performed in the following process. However, the gap layer 42 formed on the rear end portion 41b is cut when performing the process of exposing the top surfaces 36a and 37a of the recording-side contact layer 36 and the reproducing-side contact layer 37 illustrated in FIG. 5, so that the entire process can be simplified.

Figure 6:
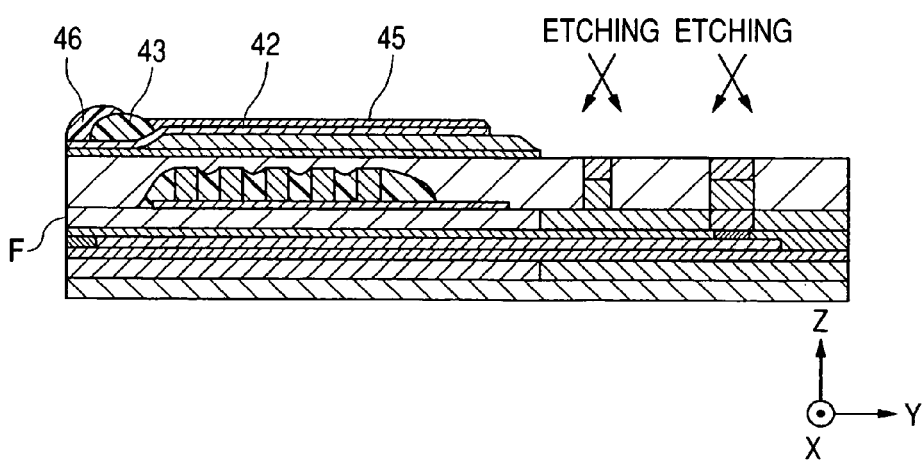
FIG. 6 is a diagram illustrating a following process of FIG. 5 (partial longitudinal cross-sectional view)

Next, in a process illustrated in FIG. 6, the protective resist layer 44 is removed. Next, an insulating base layer 45 formed of resist or the like is formed on the gap layer 42. Since the insulating base layer 45 is an insulating base layer used when forming upper coil pieces (which will be described in detail in the following process), the insulating base layer 45 is formed in a region where the upper coil pieces are formed. In the case in which the insulating base layer 45 is formed of resist, after the insulating base layer 45 is formed, the insulating base layer 45 is subjected to a heat treatment so as to be hardened. Next, the gap layer 42, which is exposed more toward the front of the facing surface F than the Gd determining layer 43, is covered with the protective resist layer 46. Then, oxide layers, which are formed on the top surfaces 36a and 37a of the recording-side contact layer 36 and the reproducing-side contact layer 37, are removed by a cleaning process using etching. The top surface of the gap layer 42, which is covered with the protective resist layer 46 and exposed more toward the front of the facing surface F than the Gd determining layer 43, is not affected by the etching.

Figure 7:
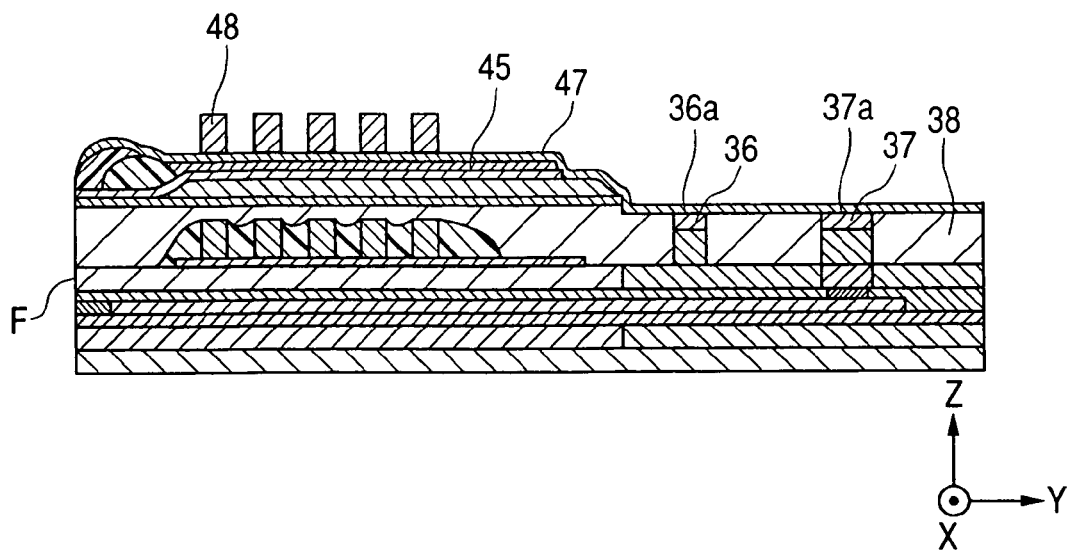
FIG. 7 is a diagram illustrating a following process of FIG. 6 (partial longitudinal cross-sectional view)

Next, in a process illustrated in FIG. 7, by means of a sputtering method or a deposition method, an upper coil piece base layer 47 is formed on all of the insulating base layer 45, the insulating material layer 38, and the top surfaces 36a and 37a of the recording-side contact layer 36 and the reproducing-side contact layer 37. At this time, at least a surface layer of the upper coil piece base layer 47 is formed of one or two or more alloys selected from Au, Ru, and Rh. The upper coil piece base layer 47 may be formed with a single-layered structure or a multilayered structure. When the upper coil piece base layer 47 is formed with a single-layered structure, the entire upper coil piece base layer 47 is formed of one or two or more alloys selected from Au, Ru, and Rh. When the upper coil piece base layer 47 is formed with the multilayered structure, at least the uppermost surface layer of the upper coil piece base layer 47 is formed of one or two or more alloys selected from Au, Ru, and Rh.

As shown in FIG. 7, the upper coil piece base layer 47 covers the top surfaces 36a and 37a of the recording-side contact layer 36 and the reproducing-side contact layer 37.

Next, a resist layer (not shown) is coated on the upper coil piece base layer 47, an extraction pattern having the same shape as the upper coil piece 48 is formed on the resist layer by means of exposure and development, and the upper coil pieces 48 are formed in the extraction patterns by plating. Then, the resist layer is removed. An end portion of each of the upper coil pieces 48 is electrically connected to an end portion of each of the corresponding lower coil pieces 33 so as to form a helical coil.

Figure 8:
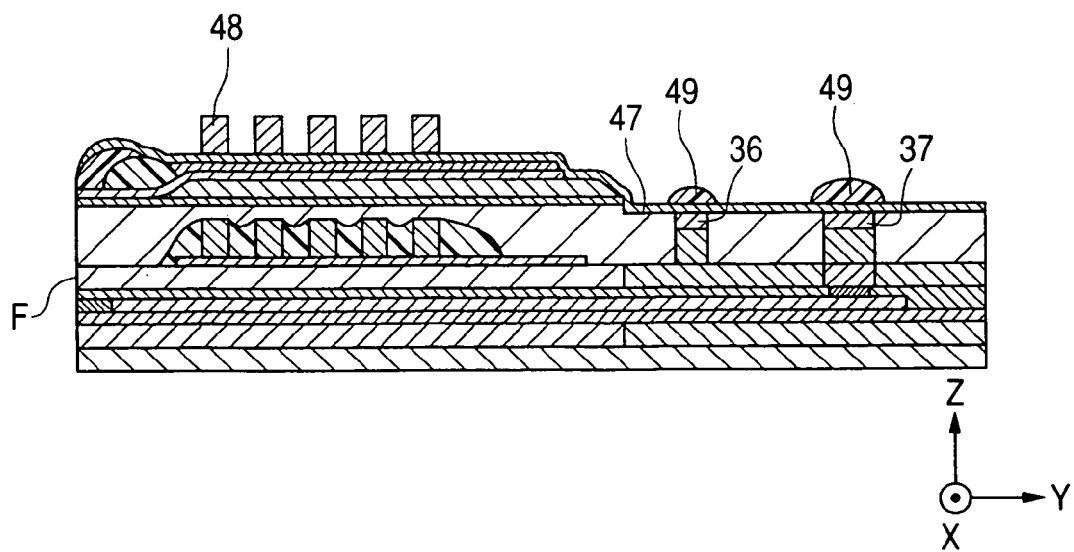
FIG. 8 is a diagram illustrating a following process of FIG. 7 (partial longitudinal cross-sectional view)

Next, as shown in FIG. 8, protective resist layers 49 are formed on the upper coil piece base layer 47 that is opposite to the recording-side contact layer 36 and the reproducing-side contact layer 37 in a film thicknesswise direction (Z direction in the drawing).

Figure 9:
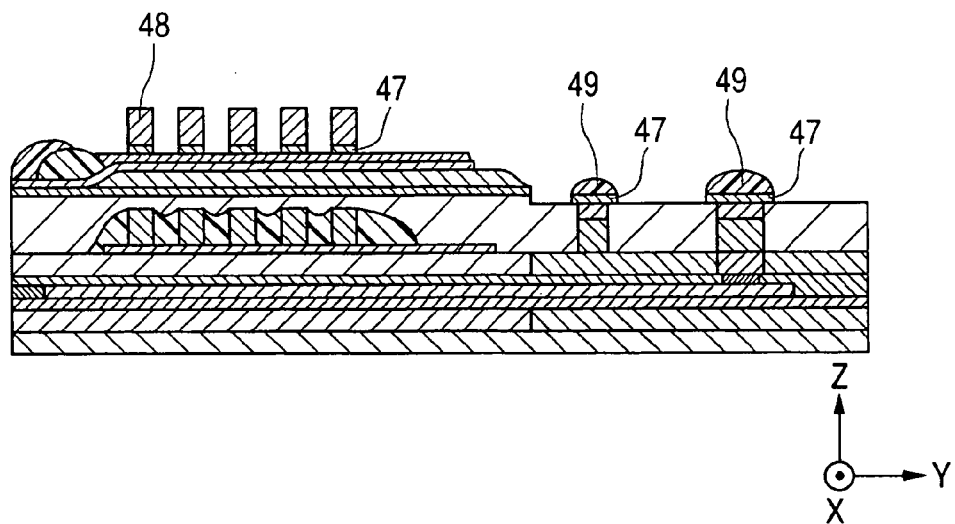
FIG. 9 is a diagram illustrating a following process of FIG. 8 (partial longitudinal cross-sectional view)

Next, in a process illustrated in FIG. 9, a portion of the upper coil piece base layer 47, which is not covered with the upper coil pieces 48 and the protective resist layers 49, is removed by etching. Thereby, the upper coil piece base layer 47 remains only below the protective resist layers 49 and the upper coil pieces 48.

Figure 10:
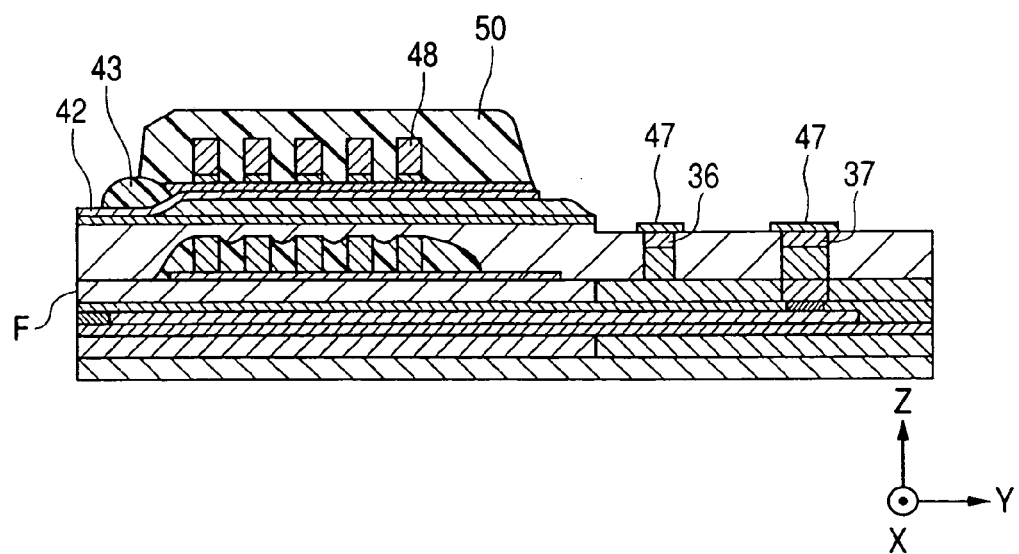
FIG. 10 is a diagram illustrating a following process of FIG. 9 (partial longitudinal cross-sectional view)

Next, in a process illustrated in FIG. 10, the protective resist layer 46, which covers the gap layer 42 exposed more toward the front of the facing surface F than the Gd determining layer 43, and the protective resist layers 49, which cover the recording-side contact layer 36 and the reproducing-side contact layer 37, are removed, respectively. Next, the upper coil pieces 48 are covered with the coil insulating layer 50. In this case, when the coil insulating layer 50 is formed of, for example, resist, after the coil insulating layer 50 is formed, it is subjected to a heat treatment so as to be hardened.

Figure 11:
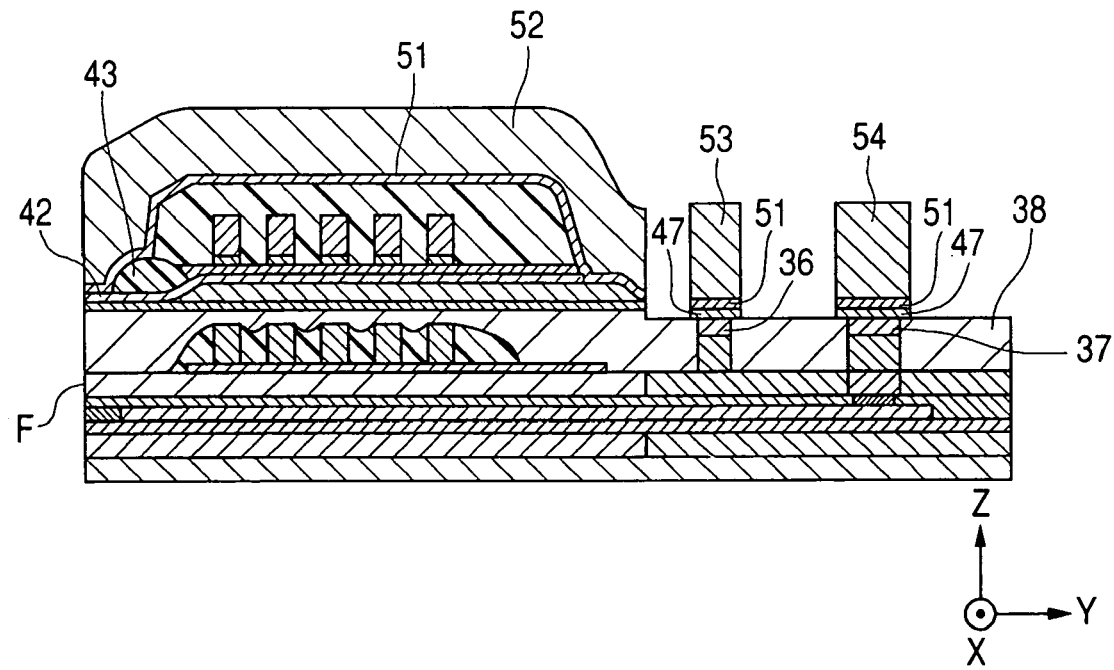
FIG. 11 is a diagram illustrating a following process of FIG. 10 (partial longitudinal cross-sectional view)

Next, in a process illustrated in FIG. 11, a return yoke layer 52 (second magnetic layer) is formed by plating. In the same manner as the plating layer having been obtained through the processes until now, when the return yoke layer 52 is formed by plating, first, a conductive base layer is formed by using a sputtering method, and then a plating layer is formed on the base layer. Therefore, when the process of FIG. 10 proceeds to the process of FIG. 11, a magnetic head in the middle of the manufacturing process moves into a sputtering device. At this time, as shown in FIG. 10, the recording-side contact layer 36 and the reproducing-side contact layer 37 are covered with the upper coil piece base layer 47 of which a surface layer is formed of one or two or more alloys selected from Au, Ru, and Rh and which has high corrosion resistance. Therefore, even if the upper coil piece base layer 47 is exposed to the air, an oxide layer is not formed on the surface of the upper coil piece base layer 47, and an oxide layer is not formed on each of the recording-side contact layer 36 and the reproducing-side contact layer 37. In the related art, since the upper coil piece base layer is formed of, for example, Cu, the upper coil piece base layer is oxidized due to air exposure. Even when the recording-side contact layer 36 and the reproducing-side contact layer 37 are covered with the upper coil piece base layer formed of Cu, the surfaces of the recording-side contact layer 36 and the reproducing-side contact layer 37 may be easily oxidized. As a result, when the process of FIG. 10 proceeds to the process of FIG. 11, it is first required to perform a cleaning process for removing the oxide layer. At this time, as shown in FIG. 10, since the gap layer 42 is exposed more toward the front of the facing surface F than the Gd determining layer 43, the surface of the gap layer 42 exposed to the front of the facing surface F or the surface of the Gd determining layer 43 is affected by the cleaning process, so that they may be cut. However, according to the embodiment of the invention, since the above-mentioned cleaning process is not necessary, the surface of the gap layer 42 or the surface of the Gd determining layer 43 is not cut, as in the related art.

In a process illustrated in FIG. 11, first, by means of a sputtering method, a conductive return yoke base layer 51 is formed on all of the gap layer 42 exposed more toward the front of the facing surface F than the Gd determining layer 43, the Gd determining layer 43, the coil insulating layer 50, and the upper coil piece base layer 47 and the insulating material layer 38 covering the recording-side contact layer 36 and the reproducing-side contact layer 37, respectively. Next, a resist layer (not shown) is coated on the return yoke base layer 51, and an extraction pattern having the same shape as the return yoke layer is formed on the resist layer by exposure and development. At this time, the extraction patterns are formed on the return yoke base layers 51 covering the recording-side contact layer 36 and the reproducing-side contact layer 37 so as to form a fourth lifting layer 53 (conductive layer) and a fifth lifting layer 54 (conductive layer). In addition, the return yoke layer 52, the fourth lifting layer 53, and the fifth lifting layer 54 are formed in the extraction patterns by plating. The return yoke layer 52, the fourth lifting layer 53, and the fifth lifting layer 54 are made of the same material and the return yoke layer 52, the fourth lifting layer 53, and the fifth lifting layer 54 are simultaneously performed. In addition, the resist layer is removed, and then a portion of the return yoke layer 52, which is not covered with the return yoke layer 52, the fourth lifting layer 53, and the fifth lifting layer 54, is removed by etching.

Figure 12:
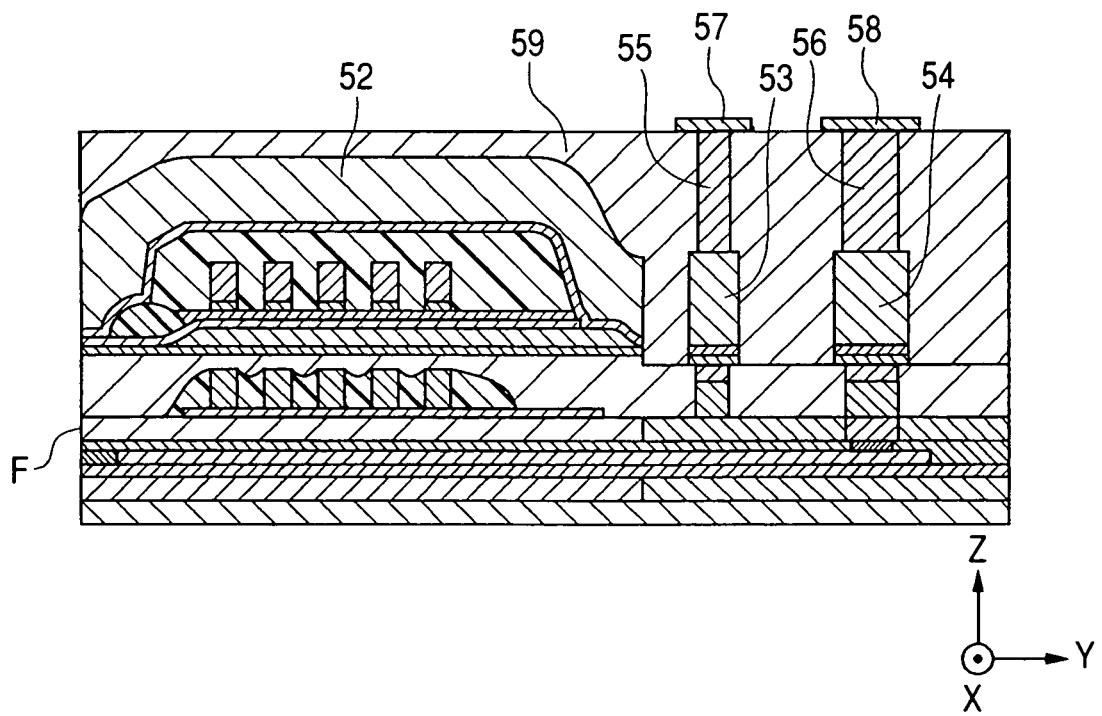
FIG. 12 is a diagram illustrating a following process of FIG. 11 (partial longitudinal cross-sectional view)

In a process illustrated in FIG. 12, bumps 55 and 56 are respectively plated on the fourth lifting layer 53 and the fifth lifting layer 54 by using a photolithography technology. In addition, a protective layer 59 made of an insulating material such as $Al_2O_3$ or the like is formed on the return yoke layer 52, the surface of the protective layer 59 is planarized by a CMP technology, the surfaces of the bumps 55 and 56 are exposed to the surface of the protective layer 59, and pad portions 57 and 58, each of which is made of a conductive material, are plated on the corresponding bumps 55 and 56, respectively.

Figure 13:
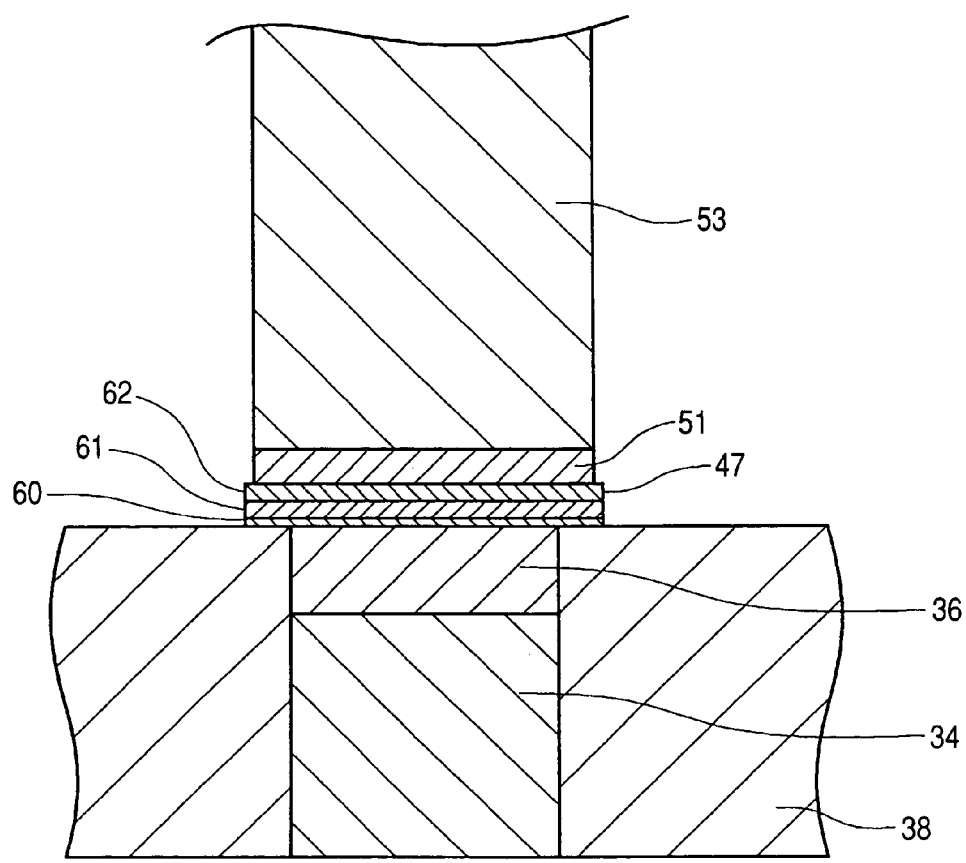
FIG. 13 is a partially enlarged cross-sectional view of a laminated structure of a portion including a recording-side contact layer.
Figure 14:
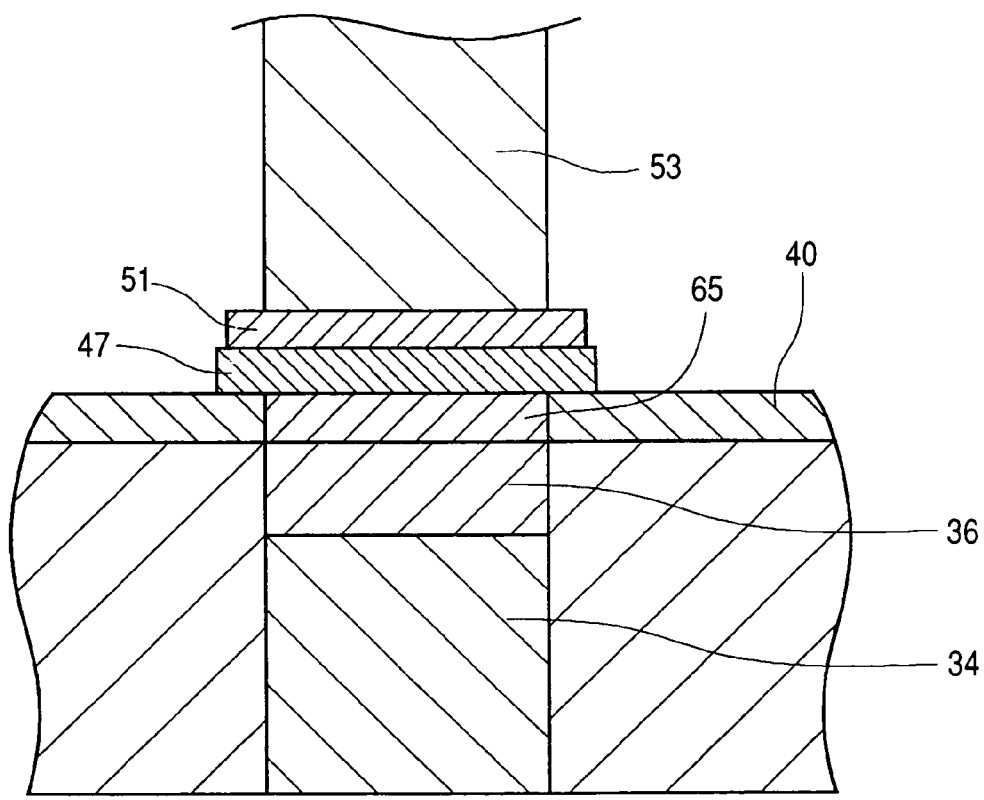
FIG. 14 is a partially enlarged cross-sectional view of a laminated structure of a portion including a recording-side contact layer different from the laminated structure of FIG. 13.
Figure 15:
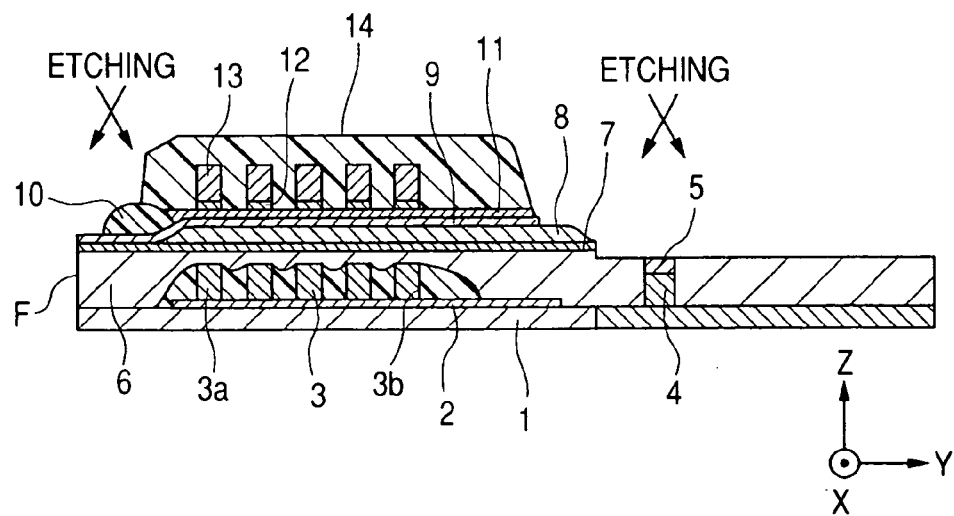
FIG. 15 is a diagram illustrating a process of a method of manufacturing a conventional perpendicular magnetic recording head (partial longitudinal cross-sectional view of the perpendicular magnetic recording head)
Figure 16:
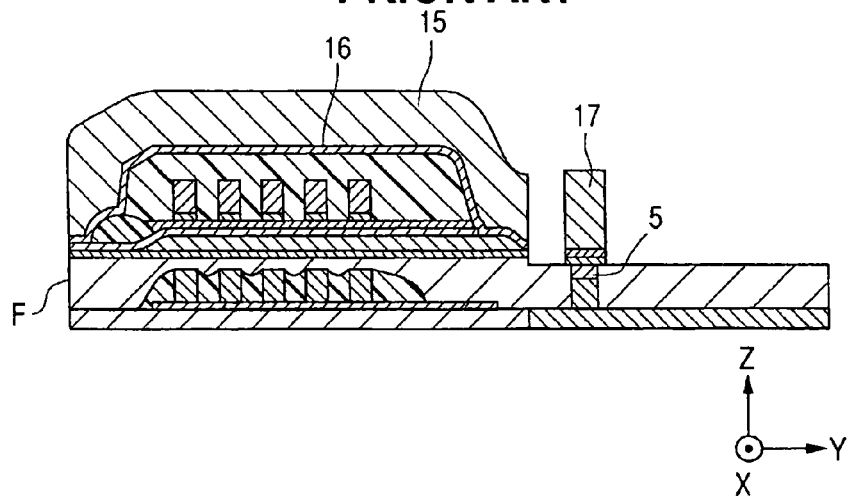
FIG. 16 is a diagram illustrating a following process of FIG. 15 (partial longitudinal cross-sectional view)
Figure 17:
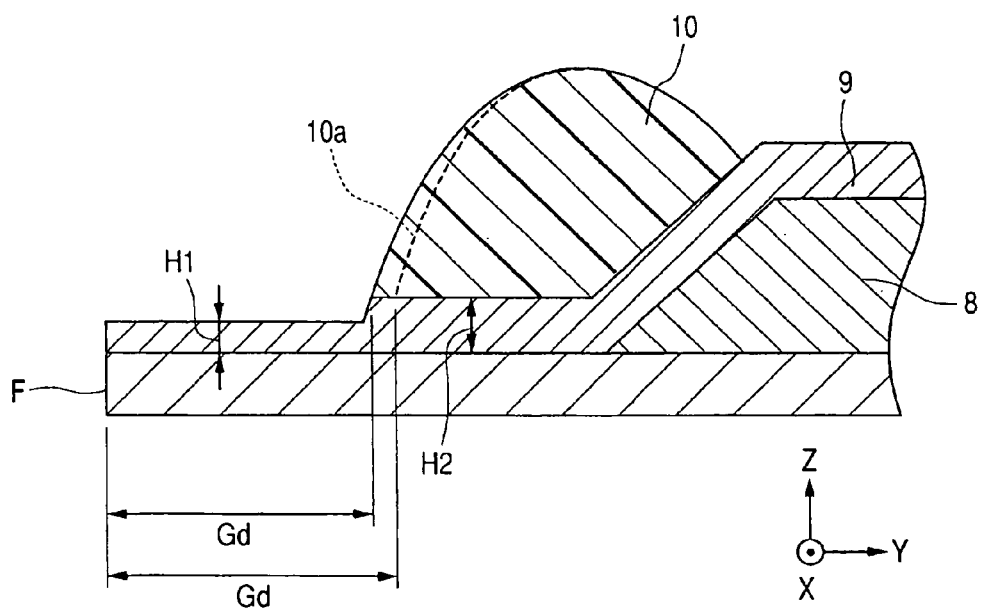
FIG. 17 is a partially enlarged cross-sectional view of the magnetic head in the manufacturing processes for explaining the problems in a method of manufacturing the conventional magnetic head.

FIG. 13 is a partially enlarged cross-sectional view of a laminated structure of a portion including the recording-side contact layer 36. As shown in FIG. 13, the upper coil piece base layer 47, the return yoke base layer 51, and the fourth lifting layer 53 are sequentially laminated on the recording-side contact layer 36. As shown in FIG. 13, the upper coil piece base layer 47 has a three-layered structure in which a Ti layer 60, a Cu layer 61, and an Au layer 62 are sequentially laminated. As described above, the upper coil piece base layer 47 may have a single-layered structure. In this case, the entire upper coil piece base layer 47 is formed of one or two or more alloys selected from Au, Ru, and Rh. The laminated structure illustrated in FIG. 13 is applicable for a laminated structure of a side including the reproducing-side contact layer 37. In addition, the above-mentioned laminated structure is only one example. For example, when the auxiliary yoke layer 41 is formed in the process of FIG. 4, a lifting layer 65 (conductive layer) made of the same material as the auxiliary yoke layer 41 may be plated on the recording-side contact layer 36 and the reproducing-side contact layer 37. Alternatively, when the main magnetic pole layer 39 is formed, a lifting layer (conductive layer) made of the same material as the main magnetic pole layer 39 may be plated on the recording-side contact layer 36 and the reproducing-side contact layer 37. Then, when the auxiliary yoke layer 41 is formed, a lifting layer 65 (conductive layer) made of the same material as the auxiliary yoke layer 41 may be plated on the corresponding lifting layer. In FIG. 14, the lifting layer 65, the upper coil piece base layer 47, the return yoke base layer 51, and the fourth lifting layer 53 are sequentially laminated on the recording-side contact layer 36. The laminated structure illustrated in FIG. 14 is applicable for a laminated structure of a side including the reproducing-side contact layer 37.

The characteristics of the method of manufacturing the magnetic head according to the embodiment of the invention are as follows. In the process illustrated in FIG. 7, the upper coil piece base layer 47 is formed on all of the insulating base layer 45, the insulating material layer 38, and the top surfaces 36a and 37a of the recording-side contact layer 36 and the reproducing-side contact layer 37 by means of a sputtering method or a deposition method. At this time, at least a surface layer of the upper coil piece base layer 47 is formed of one or two or more alloys selected from Au, Ru, and Rh. In the process illustrated in FIG. 8, the protective resist layer 49 is formed on the upper coil piece base layer 47 which is opposite to the recording-side contact layer 36 and the reproducing-side contact layer 37 in a film thicknesswise direction (Z direction in the drawing) Further, in the process illustrated in FIG. 9, when the unnecessary upper coil piece base layer 47 is removed, portions of the upper coil piece base layer 47 remain on the recording-side contact layer 36 and the reproducing-side contact layer 37.

As such, since the surface layer of the upper coil piece base layer 47 is formed of one or two or more alloys selected from Au, Ru, and Rh, the upper coil piece base layer 47 is not oxidized due to the air exposure, and has high corrosion resistance. In addition, the upper coil piece base layer 47 is provided as a base for forming the upper coil pieces 48 by plating and a protective layer for preventing the recording-side contact layer 36 and the reproducing-side contact layer 37 from oxidizing. The upper coil piece base layer 47, which functions as the base and the protective layer, may be a single layer formed of Au or the like. Therefore, the upper coil piece base 47 functioning as the base and the upper coil piece base layer 47 functioning as the protective layer do not need to be differently provided. According to the related art, when the process of FIG. 10 proceeds to the process of FIG. 11, it is required to perform a cleaning process for removing the oxide layers formed on the surfaces of the recording-side contact layer 36 and the reproducing-side contact layer 37, and the gap layer 42 exposed to the front of the Gd determining layer 43 is affected by etching so as to be cut. However, according to the embodiment of the invention, the upper coil piece base layer 47 having a surface layer formed of one or two or more alloys selected from Au, Ru, and Rh is provided on the recording-side contact layer 36 and the reproducing-side contact layer 37, and even if the upper coil piece base layer 47 is exposed to the air, it is not oxidized due to the air exposure. As a result, it is possible to prevent the recording-side contact layer 36 and the reproducing-side contact layer 37 from oxidizing. Therefore, according to the embodiment of the invention, since the above-mentioned etching process can become unnecessary and the manufacturing process can be simplified, it is possible to resolve the above-mentioned conventional problems in that the gap layer 42 or the Gd determining layer 43 is cut. Further, it is possible to further improve the film thickness control and shape control of the gap layer 42 and the positional precision of the front end surface of the Gd determining layer 43 (that is, it is possible to properly restrict a gap depth to a predetermined value), as compared with the related art. Furthermore, preferably, the surface layer of the upper coil piece base layer 47 is formed of Au that is the most inert metal.

In addition, the upper coil piece base layer 47 may be formed on only regions where the upper coil pieces 48 are formed and the recording-side contact layer 36 and the reproducing-side contact layer 37 from the beginning. However, as illustrated in the processes of FIGS. 7 to 9, it is preferable to use the method in which the upper coil piece base layer 47 is formed on the entire surface of the corresponding layers and then the unnecessary portions of the upper coil piece base layer 47 are removed. That is, according to this method, the upper coil piece base layer 47 can be provided on necessary portions, and portions of the upper coil piece base layer 47 remaining below the upper coil pieces 48 can be electrically separated from portions of the upper coil piece base layer 47 remaining on the recording-side contact layer 36 and the reproducing-side contact layer 37.

The magnetic head formed by the above-mentioned method is a composite head between the reproducing head and the perpendicular magnetic recording head, but may be only the perpendicular magnetic recording head. In this case, since the reproducing-side contact layer 37 connected to the electrode layer 26 of the reproducing head is not formed, the contact layer, which is exposed to the periphery of the main magnetic pole layer 39 corresponding to a first magnetic layer is only the recording-side contact layer 36. In the processes of FIGS. 9 and 10, the recording-side contact layer 36 is covered with the upper coil piece base layer 47. In addition, the recording head (inductive head) may not be the perpendicular magnetic recording head. As described above, even when the magnetic head is the composite head, the contact layers, which are exposed to the periphery of the main magnetic pole layer 39 corresponding to the first magnetic layer, do not need to correspond to the recording-side contact layer 36 and the reproducing-side contact layer 37, and the contact layer may correspond to any one of the recording-side contact layer 36 and the reproducing-side contact layer 37. In particular, when the magnetic head is the composite head, generally, the reproducing head is formed at the lower side (slider 20 side) and the recording inductive head is laminated on the reproducing head. Therefore, according to the structure of the inductive head, only the reproducing-side contact layer 37 is exposed to the periphery of the first magnetic layer. This type may be included in the embodiments of the invention.

Further, although the above-mentioned structure of the coil layer has been the helical coil structure, the invention is not limited thereto, but, may have a two-layered coil structure in which a spiral lower coil layer is provided below the main magnetic pole layer 39, a spiral upper coil layer is provided between the main magnetic pole layer 39 and the return yoke layer 52, and the lower coil layer and the upper coil layer are electrically connected to each other through a connection portion that extends in a film thicknesswise direction (Z direction in the drawing).

The invention claimed is:

1. A method of manufacturing a magnetic head which includes a first magnetic layer and a second magnetic layer that are opposite to each other in a film thicknesswise direction at a surface facing a recording medium with a gap layer interposed therebetween, and a coil layer that applies a recording magnetic field to the first magnetic layer and the second magnetic layer, the method comprising the steps of:

(a) forming a conductive coil base layer on a conductive contact layer, the conductive coil base layer being formed on the first magnetic layer with the gap layer interposed therebetween, the conductive contact layer being exposed onto an insulating material layer burying the periphery of the first magnetic layer, at least a surface layer of the coil base layer being formed of one or two or more alloys selected from a group consisting of Au, Ru, and Rh;

(b) forming a coil layer on a predetermined region of the coil base layer;

(c) covering the coil layer with a coil insulating layer;

(d) forming a conductive base layer on the gap layer and the coil insulating layer by using a sputtering method so as to plate the second magnetic layer on the conductive base layer, the gap layer being exposed more toward the facing surface than the coil insulating layer; and (e) plating a conductive layer on the coil base layer remaining on the contact layer.

2. The method of manufacturing a magnetic head according to claim 1, wherein during the step (b), a portion of the coil base layer that is not covered with the coil layer is removed in a state in which the coil base layer formed on the contact layer is protected after forming the coil layer.

3. The method of manufacturing a magnetic head according to claim 1, further comprising the steps of:

before the step (a), forming a lower coil layer at a lower side of the first magnetic layer; and forming the contact layer on a predetermined portion of the lower coil layer; and exposing the contact layer to the insulating material layer, wherein the coil layer formed by the step (b) is formed as an upper coil layer that is provided between the first magnetic layer and the second magnetic layer.

4. The method of manufacturing a magnetic head according to claim 1, wherein the conductive layer in the step (e) is formed of the same material as the second magnetic layer, and the forming of the second magnetic layer in the step (d) and the forming of the conducive layer in the step (e) are simultaneously performed.

5. The method of manufacturing a magnetic head according to claim 1, further comprising the steps of:

before the step (a), forming a reproducing head unit having a magnetism detecting element and a shield layer at a location lower than the first magnetic layer;

forming the contact layer on an electrode layer for supplying a current to the magnetism detecting element; and exposing the contact layer onto the insulating material layer.

* * * * *